United States Patent [19]

Oldfield

[11] 3,937,310

[45] Feb. 10, 1976

[54] SPRAG CLUTCHES

[75] Inventor: Benjamin Duncan Oldfield, Cheadle, England

[73] Assignee: Renold Limited, Manchester, England

[22] Filed: Sept. 23, 1974

[21] Appl. No.: 508,708

[30] Foreign Application Priority Data
Sept. 29, 1973 United Kingdom............... 45640/73

[52] U.S. Cl............................. 192/41 A; 192/45.1
[51] Int. Cl.²......................................... F16D 41/07
[58] Field of Search ......... 192/41 A, 45.1; 188/82.8

[56] References Cited
UNITED STATES PATENTS
3,651,908  3/1972  Oldfield...................... 192/41 A X
3,743,066  7/1973  DeLavalette.................... 192/41 A Primary Examiner—Allan D. Herrmann
Attorney, Agent, or Firm—Flynn & Frishauf

[57] ABSTRACT

In a sprag clutch having individual energising springs, one for each sprag, in which the forces on the sprags during outer race overrunning give rise to only a small rubbing load between the sprags and the clutch inner race at all outer race overrunning speeds within a designed limit, without nevertheless lifting off the clutch inner race, thereby limiting wear on overrun of the clutch, the sprags and the springs are staggered whereby each pair of adjacent sprags of said ring of sprags are offset relative to one another axially of the assemblage, and likewise the pair of springs associated with them, the sprags being shaped and arranged to interengage with one another between the springs to limit the tilt of the sprags in the driving phase of the clutch.

21 Claims, 15 Drawing Figures

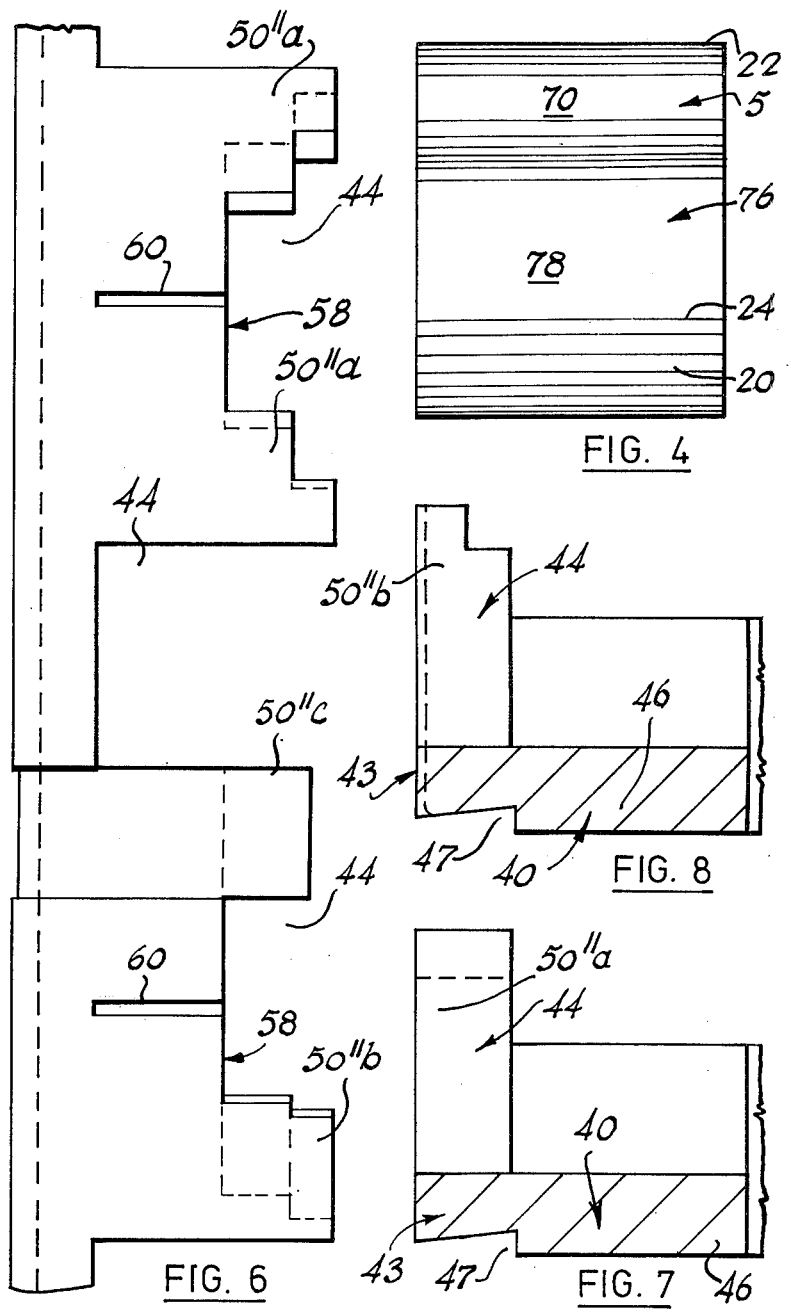

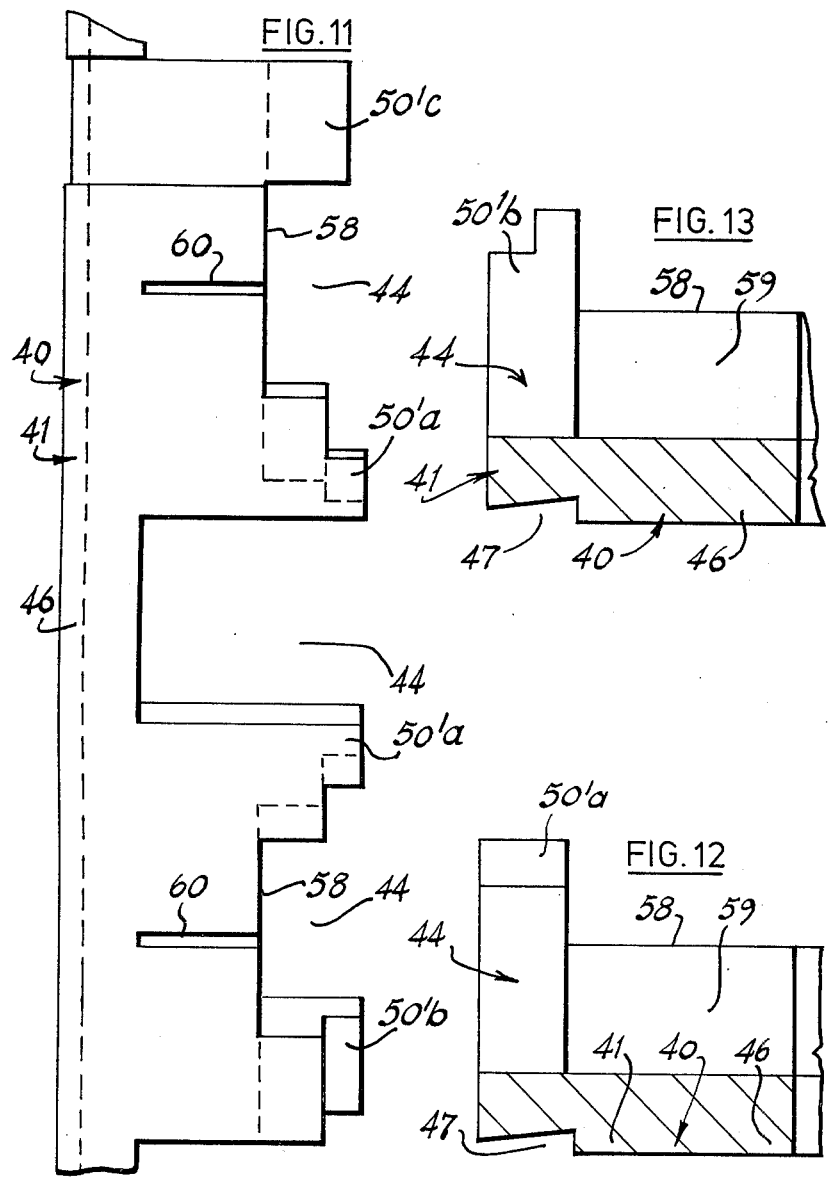

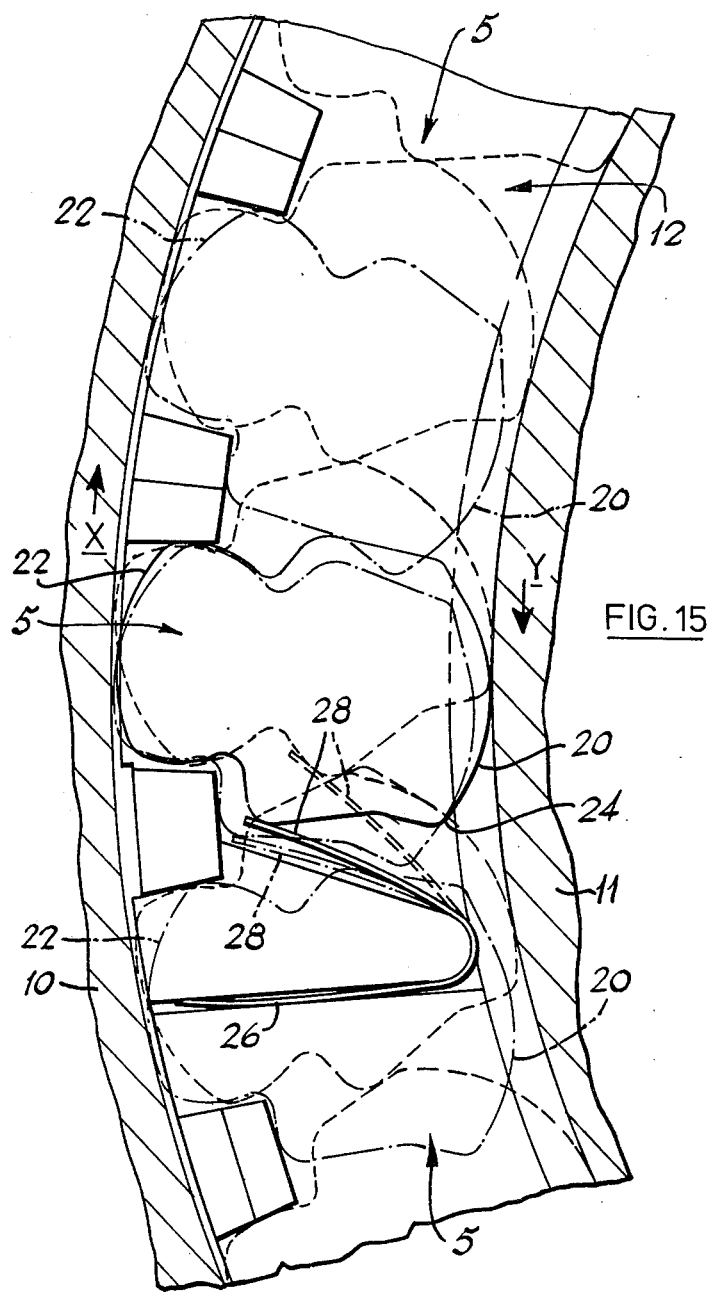

SPRAG CLUTCHES

This invention comprises improvements in or relating to sprag clutches and concerns sprag-retainer assemblages for sprag clutches.

An object of this invention is to provide a sprag-retainer assemblage for a sprag clutch, for use in transmitting a uni-directional drive between the inner and outer races of the clutch, and combining an improved outer race overrunning speed compared with its inner race overrunning speed and an improved facility to resist sprag roll-over.

In U.S. Pat. No. 3,651,908 there is described a sprag-retainer assemblage for use in an annular gap defined between confronting cylindrical surfaces of inner and outer races of a sprag clutch to transmit uni-directional drive between the clutch driving and driven race, the assemblage comprising an annular sprag retainer, a ring of sprags in the retainer, and, for each sprag an energising spring individual to the sprag for biasing the sprag into substantially line contact with the inner race of the clutch, by tilting the sprag about substantially a line of contact with the outer race of the clutch, with a component of spring force directed radially inwardly of the assemblage, whereby the centrifugal force acting on the spring during overrunning of the outer race of the clutch, in use of the assemblage, relieves the spring force on the sprag, the centre of gravity of each sprag being disposed close to or in the radial axial plane of the assemblage containing said line of contact between said sprag and the outer race during overrunning of the outer race of the clutch such that the centrifugal force acting on the sprag during overrunning of the outer race of the clutch acts in conjunction with the spring force on the sprag so as to maintain a small load between the sprag and the inner race on over run of the outer race, at least within a predetermined limit of outer race overrunning speed.

By decreasing the load between each sprag and the inner race during overrunning of outer race or by minimising the increase of load between each sprag and the inner race during overrunning of the outer race, the permitted overrunning speed of the outer race compared with the inner race overrunning speed, may be increased.

In U.S. Pat. No. 3,302,761 there is described a clutch sprag for assembly with an annular retainer and other identical sprags of a circumferentially compact annular series between races of an overrunning clutch, said sprag having radially opposite ends provided with surfaces for releasable driving action between and on said races, said sprag having first and second formations of substantial size projecting respectively from the leading and trailing circumferential sides of the sprag, in respect to the driving direction of the clutch, the first formation of said sprag being engageable with the second formation of a preceding sprag to limit tilt in a driving phase of said releasable driving action.

The tilt limitation in a driving phase of said releasable driving action relates to roll-over of the sprag. Thus with sprags as described in U.S. Pat. No. 3,302,761, adjacent sprags in a sprag retainer assemblage for a sprag clutch, for use in transmitting a uni-directional drive between the inner and the outer reaces of the clutch, interengage with one another to prevent roll-over of the sprags.

More specifically, an object of this invention is to provide a sprag-retainer assemblage for a sprag clutch, for use in transmitting a uni-directional drive between the inner and outer races of the clutch, having an improved outer race overrunning speed compared with its inner race overrunning speed and which employs interengagement between adjacent sprags to limit the tilt of the sprags in the driving phase of the clutch.

This invention provides a sprag-retainer assemblage as defined in the third paragraph of this specification in which the sprags and the energising springs are staggered whereby each pair of adjacent sprags of said ring of sprags are offset relative to one another axially of the assemblage, and likewise the pair of springs associated with them, the sprags being shaped and arranged to interengage with one another between the springs to limit the tilt of the sprags in the driving phase of the clutch.

The sprags may be further shaped and arranged to engage with the sprag retainer, and adjacent pairs of the sprags possibly also with one another, to limit the tilt of the sprags in the opposite sense, such as might otherwise lead to pop-out or kick-off of the sprags. This phenomenon, and the causes of it, are described in U.S. Pat. No. 3,302,761 and in U.S. Pat. No. 3,651,908.

Preferably, the annular sprag retainer is formed in two annular parts assembled side-by-side.

Preferably also, the two annular parts of the sprag retainer are removably assembled side-by-side and held together by spring clips.

The two annular parts of the sprag retainer may have interfitting formations which locate them angularly with respect to one another.

They may also have interfitting formations which locate them concentrically with respect to one another.

It is preferred that the two annular parts of the sprag retainer are formed as or comprise mouldings, and conveniently, they are plastics mouldings.

The sprags and the retainer may have interlocking formations which are urged into interlocking engagement with one another by the springs individual to the sprags so long as the assemblage is free of any races, the interlocking formations then resisting radially inward displacement of the sprags with respect to the retainer.

The centrifugal force acting on each sprag during overrunning of the outer race of the clutch may pass through said line of contact of the sprag with the outer race of the clutch.

Alternatively, the centrifugal force acting on each sprag during overrunning of the outer race of the clutch may pass to that side of said line of contact of the sprag with the outer race of the clutch such as to oppose the spring force tending to tilt the sprag about said line, as aforesaid.

Preferably, however, the centrifugal force acting on each sprag during overrunning of the outer race of the clutch passes to that side of said line of contact of the sprag with the outer race of the clutch such as to assist the spring force tending to tilt the sprag about said line, as aforesaid.

Preferably, each energising spring is a blade spring.

Preferably, also, each blade spring comprises a lightweight, elongated arm anchored to the sprag retainer at one end, the other, free end of the arm engaging the sprag.

Thus, said spring arm may be anchored at its radially inner end, the arm extending outwardly at an angle to the radial direction to its other, free end which engages the sprag.

Conveniently, the blade spring is of U-shape comprising a further elongated arm joined with said first elongated arm at its radially inner end, and said further elongated arm is attached to the sprag retainer, preferably removably.

In the preferred arrangement also, the annular sprag retainer receives and guides the radially outer ends of the sprags for tilting movement.

This invention also comprehends a sprag clutch comprising inner and outer races and at least one spragretainer assemblage, according to this invention as hereinbefore defined, disposed in an annular gap between the races and arranged to transmit a uni-directional drive between the clutch driving and driven race.

A specific embodiment of a sprag retainer assemblage according to this invention, and of a sprag clutch according to this invention, which embodies the assemblage, will now be described, by way of example, and not by way of limitation, with reference to the accompanying drawings in which.

Figures 3, 5:
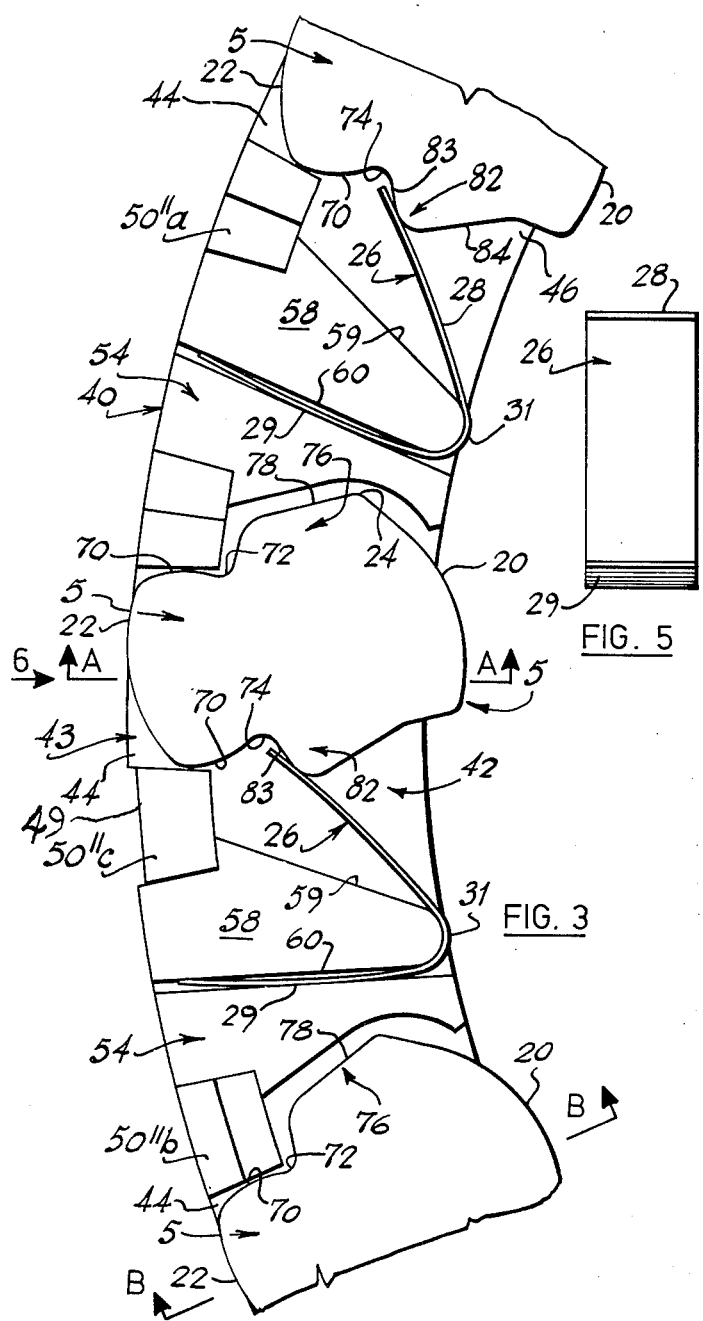
Figure 9:
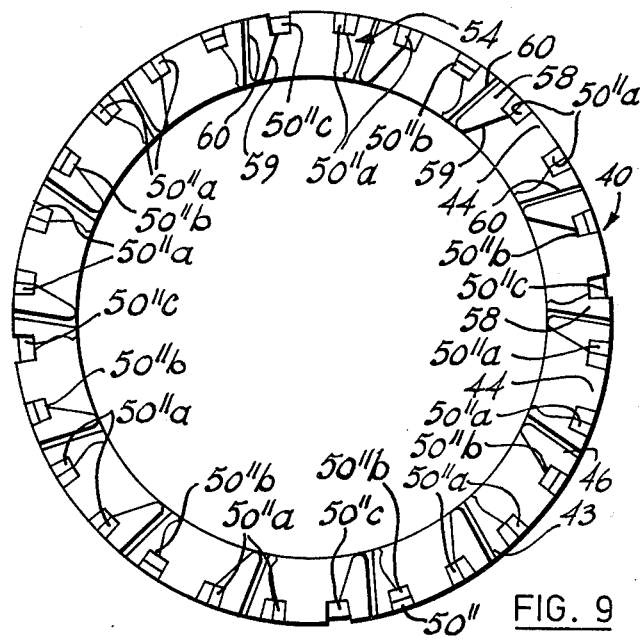
Figure 14:
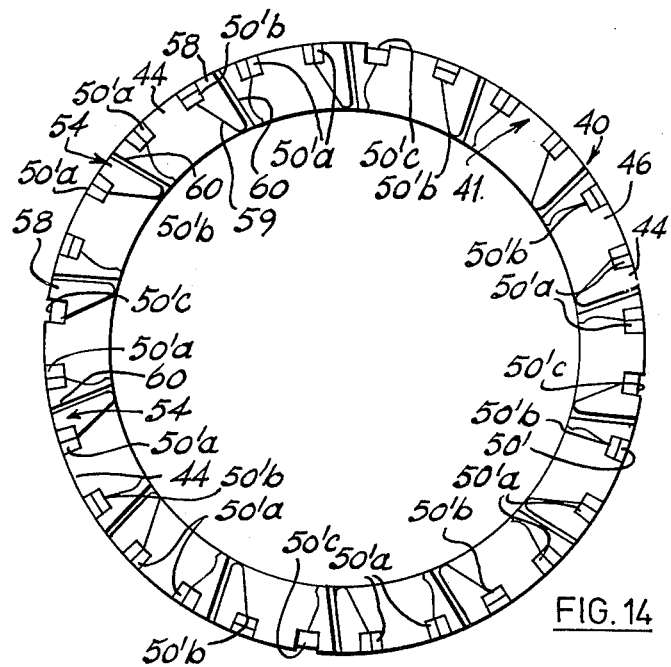
Figure 10:
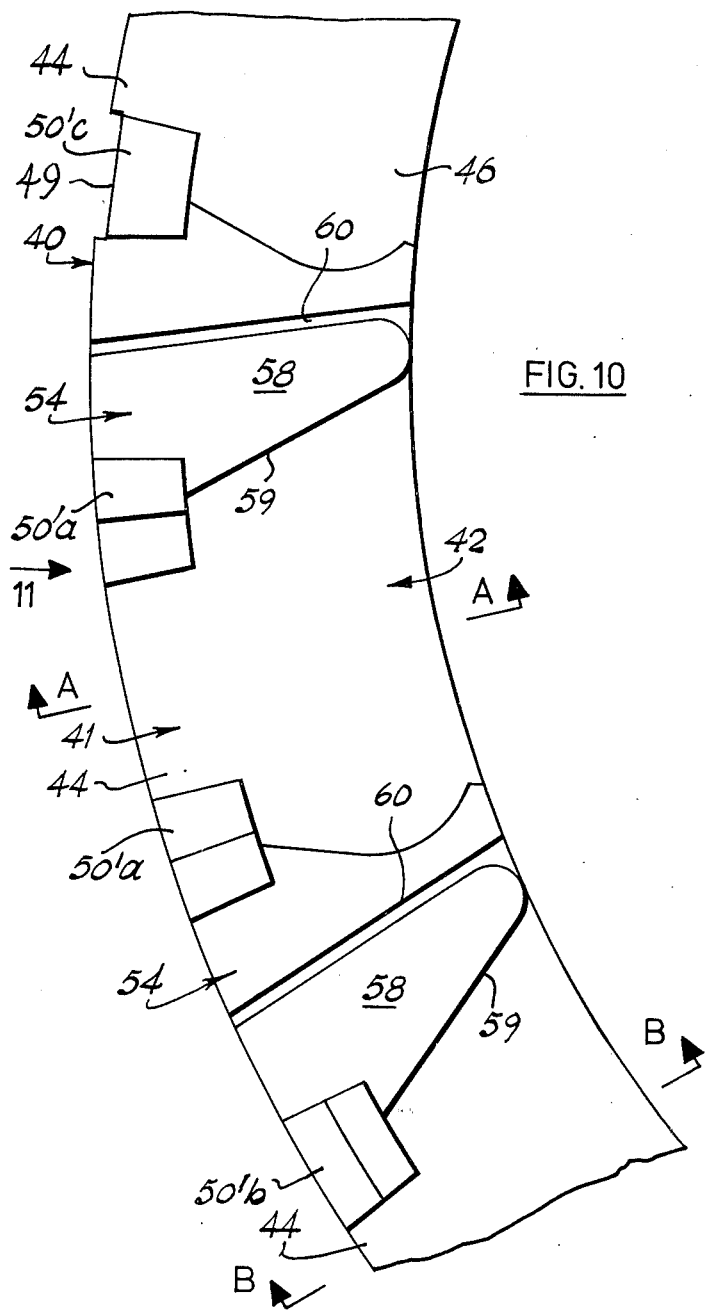

FIG. 3 is a partial front elevational view, to a larger size, of a part of the assemblage showing a portion of a retainer part, three of the sprags and two of the energising springs, FIG. 4 is an end elevation of one of the sprags, all of which are identical in this construction, FIG. 5 is a plan view of one of the energising springs, all of which are identical in this construction, FIG. 6 is a view in the direction of arrow 6 in FIG. 3, FIG. 7 is a cross-section on line A—A in FIG. 3, FIG. 8 is a cross-section on line B—B in FIG. 3, FIG. 9 is a front elevation corresponding to FIG. 3, to a smaller size, showing the whole of the retainer part partly illustrated in FIG. 3, FIG. 10 is a front elevational view of a portion of another retainer part, FIG. 11 is a view in the direction of arrow 11 in FIG. 10, FIG. 12 is a cross-section on line A—A in FIG. 10, FIG. 13 is a cross-section on line B—B in FIG. 10, FIG. 14 is a front elevation corresponding to FIG. 10, to a smaller size, showing the whole of the retainer part partly illustrated in FIG. 10, and FIG. 15 is a diagram showing a series of adjacent pairs of the sprags in a portion of the retainer positioned in an annular gap between concentric, inner and outer cylindrical race surfaces of inner and outer races of a sprag clutch and showing the various positions of the sprags.

Referring to the accompanying drawings and first to FIG. 15, a sprag clutch comprises an outer race 10 and an inner race 11 with an annular gap 12 defined between the confronting cylindrical surfaces of the races containing a ring of sprags 5 arranged circumferentially in the gap 12 and correspondingly tilted with respect to the radial directions, generally in the attitude depicted in full line, for normal torque transmission between the driving and the driven race. The broken line position of the sprags illustrates their limiting position of tilt in the driving phase of the clutch and the chain-dotted position of the sprags illustrates their limiting position of tilt in the opposite sense and such as might occur under certain conditions during a release phase of the driving action of the clutch.

The radially inner and outer end faces 20 and 22 of the sprags are shaped convexly and such that in the normal torque transmitting attitude of the sprags, the radially inner end face of each sprag has one low corner 24. As the sprgs tend to assume a more exactly radial position, their overall height increases and tends to become greater than the width of the gap 12 whereby the sprags wedge between the races to transmit the drive.

Individual energising springs 26 are provided, one for each sprag, and these act to bias the sprags lightly into contact with the inner and outer races when these are stationary. Each spring has an elongate, lightweight arm 28 anchored at one radially inner end and extending outwardly in the gap 12, at an angle to the radial direction, to its other free end which engages the sprag. The arm thus exerts a small force on the sprag in the gap 12 which has a radially inwardly directed component. This biases the end face 20 of the sprag into substantially line contact with the inner race 11 along a line extending axially of the clutch, the force of the spring tending to tilt the sprag about substantially a line of contact between its end face 22 and the outer race 10 which also extends axially of the clutch.

The inner race overruns in the direction of arrow Y and the sprags, the sprag retainer, yet to be described, and the springs, all remain stationary if the outer race is then stationary. Light rubbing takes place between the sprags and the inner race.

The outer race overruns in the direction of arrow X and takes with it the sprags, the retainer and the springs. Only the inner race may remain stationary.

The arm 28 of each spring is urged outwardly by centrifugal force acting at the centre of gravity of the arm. This relieves the spring force of the arm on its sprag.

The centre of gravity of the sprag is positioned so that during outer race overrunning it lies close to or on a radial line through the line of contact of the sprag outer end face 22 with the outer race 10. Light rubbing again takes place between the sprags and the inner race. Light rubbing is maintained despite the action of the centrifugal forces because the action of the centrifugal force relieves the spring load on the sprag thus compensating for any increase in rubbing load brought about by the action of the centrifugal force on the sprag itself. Because only light rubbing is maintained during overrunning of the outer race, this does not limit the permissible outer race overrunning speed unduly for a designed clutch life of acceptable proportions.

In the present example, the centre of gravity of each sprag is positioned so as to increase slightly the rubbing load between the sprag and the inner race during outer race overrunning. This increase is compensated for by the reduction of the energising spring force by the centrifugal force on the spring arm during outer race overrunning. However the centre of gravity of each sprag may be shifted by redesign of the sprags so that the centrifugal force on the sprags relieves this rubbing load slightly during overrunning of the outer race or so that it has no influence one way or the other on this rubbing load.

It is required that the sprags be biased into engagement with the inner race under all operating conditions of the clutch including outer race overrunning, throughout a designed outer race overrunning speed range for the clutch.

For a fuller explanation of the manner in which a light rubbing load only is maintained between the sprags and the inner race during outer race overrunning, reference may be had to U.S. Pat. No. 3,651,908.

Referring now to FIGS. 1 to 14, the sprags 5 are loosely contained in a throughway 42 in an annular sprag retainer generally indicated at 40 which is positioned in the gap 12. The throughway opens radially inwardly and radially outwardly of the retainer, radially outwardly through a circumferential ring of individual openings 44, and the outer ends of the sprags are received and guided for tilting movement of the sprags in the radially outward openings 44. The retainer comprises axially spaced end walls 46 and cross pieces 50 extending transversely between them, at the outer circumferential periphery of the end walls, the cross pieces 50 and end walls defining the openings 44. Spring mounting formations 54 are carried inside each end wall and are confined locally thereagainst so as to present axially directed faces 58 to engage the adjacent axial end faces of alternate sprags 5. Each formation 54 has a straight slot 60 extending from the inner to the outer circumferential periphery of the retainer, at a small angle to the radial direction, the slot also opening at the face 58. A spring 26 is mounted in each slot 60 (see FIG. 3). The spring is of U-shape having a further spring arm 29 joined by a rounded portion 31 with the spring arm 28. The arm 29 is slightly curved and is sprung fit in the slot 60 with the rounded portion 31 fitting snuggly against a correspondingly curved portion of the formation 54. The spring arm 28 thus extends outwardly from the inner circumferential periphery of the retainer and is sufficiently long to extend almost completely along the adjacent circumferentially directed face 59 of the formation 54 to the radially inner face of the adjacent cross piece 50 when it is fully deflected so as to lie against the face 59.

The spring 26 has an axial width somewhat less than the axial depth of its mounting slot 60 and is accordingly confined to one side of the retainer so as to engage its sprag locally at one side.

The radial outer ends of the sprags 5 are shaped with convexly curved side bearing surfaces 70 having radii or compound radii which slide against the circumferentially directed, flat and parallel opposed surfaces of the openings 44. The sprags are characterised by a cross-sectional shape in radial planes having a waist portion defined between opposite concavities 72 and 74 in their circumferentially leading and trailing sides respectively. Added to the leading side of each sprag is an integral forwardly projecting portion or nose extension 76 presenting a flat transverse contact surface 78 extending generally radially from the corner 24 to the concavity 72 and which represents a circumferentially forward continuation of the sprag body of substantial extent. The extension 76 extends throughout the axial dimension of the sprag and is of substantial height in the radially outward direction. The surface 78 is therefore relatively large and constitutes an abutment or contact surface effective to limit roll-over of the sprag.

The opposite, circumferentially rearwardly facing side of the sprag is provided with an integral, rearwardly facing formation or extension 82 in the form of a solid tail portion in an outline extending angularly, at a radially outwardly directed surface 83 extending downwardly from the concavity 74 and thence along a radially inwardly directed surface 84 to a line short of the radially inner end surface of the spag. The formation 82 is again of substantial extent circumferentially rearwardly and extends throughout the axial dimension of the sprag. This trailing surface 83 is adapted to coact with the sprag retainer and more specifically the adjacent cross piece 50 to limit tilting movement of the sprag which might otherwise lead to pop-out or kick-off of the sprag. This is illustrated in the chain dotted position of FIG. 15.

The proportions of the forward nose extension 76 and the rearward extension 82 are such that their surfaces 78 and 84 come into flat face-to-face abutting engagement as illustrated in broken line in FIG. 15 to limit tilting of the sprags in the roll-over direction.

In order to permit this limiting interengagement of the sprags in the ring of sprags carried by the retainer, despite the presence of the individual energising springs 26, the sprags are staggered whereby each adjacent pair of sprags are offset relatively to one another axially of the sprag retainer assemblage, and the springs 26 are disposed respectively to opposite sides of the region of overlap of the adjacent pairs of sprags. Thus the springs 26 are likewise arranged in staggered formation.

The springs 26 act on the rounded portions of the extensions 82 extending between their surfaces 83 and 84. Although the springs act on the sprags locally at a position offset from the mid plane perpendicular to the axis of rotation of the sprag retainer assemblage, the sprags are prevented from twisting their tilt axes out of parallel with the sprag retainer axis by the faces 58 and the confronting inside surfaces of the end walls 46 of the retainer which engage flat against the end faces of the sprags.

As shown in FIG. 3, the formations 54 are concave at their circumferentially trailing sides to receive and engage with the extensions 76 under the influence of the springs 26 when the sprag-retainer assemblage is free of the races, 10 and 11. This prevents the sprags dropping out of the retainer through the radially inner opening of the retainer throughway particularly when the sprag-retainer assemblage is being assembled between the races 10 and 11.

Figure 1:
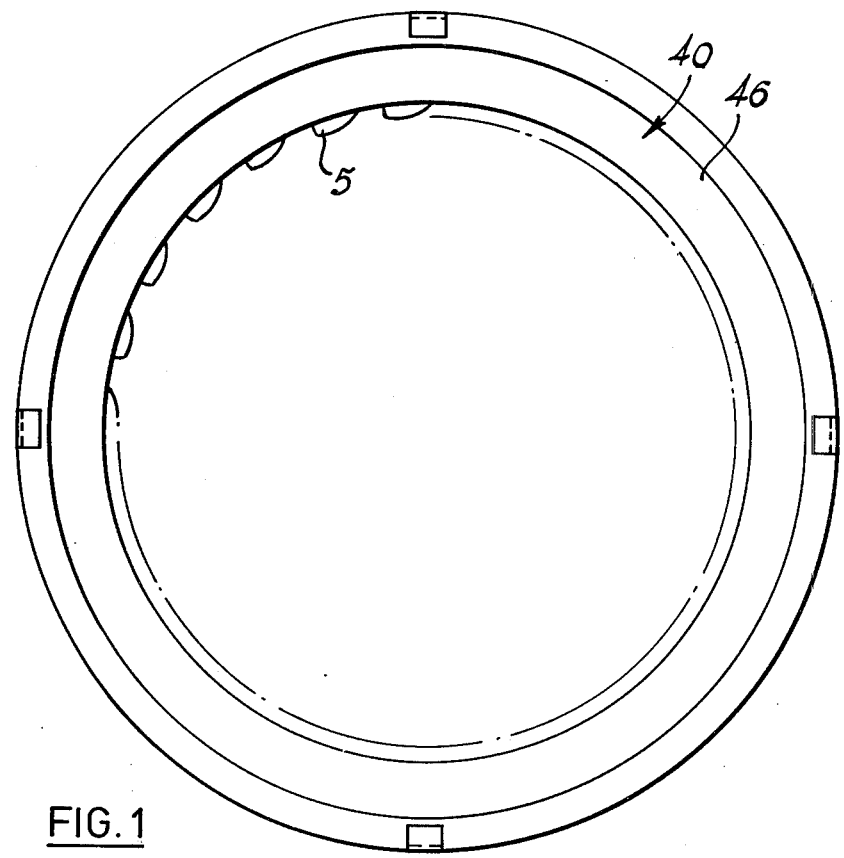
FIG. 1 is a front elevation of the sprag retainer assemblage.
Figure 2:
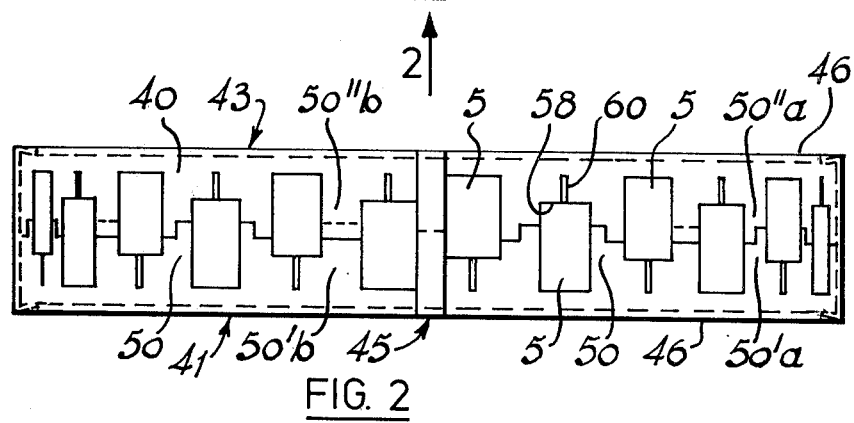
FIG. 2 is a view in the direction of arrow 2 in FIG. 1.

As more particularly illustrated in FIG. 2 the sprag retainer 40 is made in two annular injection moulded plastics parts 41 and 43 each of which is a lateral inversion of the other, apart from some minor differences which will hereinafter be noted. The parts 41 and 43 interfit at junctions in the cross pieces 50, each of which is formed in two parts respectively integral with the parts 41 and 43, which are held together by spring clips 45 the ends of which are housed in peripheral rebates 47 at the outer circumferential edges of the parts 41 and 43 respectively. The parts of the cross pieces 50 on the part 41 are indicated 50' and the parts of the cross pieces 50 on the part 43 are indicated 50''.

In order to locate the parts 41 and 43 circumferentially with respect to one another, eight uniformly spaced adjacent pairs of parts 50' indicated 50'a are formed with dogs and the corresponding parts 50'' indicated 50''a are formed with radial slots to receive the dogs.

In order to locate the parts 41 and 43 radially with respect to one another eight of the parts 50'' indicated 50''b are locally bored to form a step in them, and the corresponding parts 50' indicated 50'b are likewise stepped in complementary fashion so that an overlapping step joint is formed between the parts 50''b and 50'b.

Four slots 49 are formed across the top of four abutting parts 50' and 50'' indicated 50'c and 50''c respectively to receive the clips 45.

The construction described retains the invention of U.S. Pat. No. 3,651,908 and substitutes advantages of the invention of U.S. Pat. No. 3,302,761 to control sprag roll-over and sprag kick-off or pop-out.

Compared with a sprag clutch as described in U.S. Pat. No. 3,651,908 the construction of sprag clutch described herein has a greater density of sprags for a given diameter of the assemblage and therefore a higher torque transmission capacity.

We claim:

1. A sprag-retainer assemblage for use in an annular gap defined between confronting cylindrical surfaces of inner and outer races of a sprag clutch to transmit uni-directional drive between the clutch driving and driven race, the assemblage comprising an annular sprag retainer, a ring of sprags in the retainer, and, for each sprag an energising spring individual to the sprag for biasing the sprag into substantially line contact with the inner race of the clutch, by tilting the sprag about substantially a line of contact with the outer race of the clutch, with a component of spring force directed radially inwardly of the assemblage, whereby the centrifugal force acting on the spring during overrunning of the outer race of the clutch, in use of the asemblage, relieves the spring force on the sprag, the centre of gravity of each sprag being disposed close to or in the radial axial plane of the assemblage containing said line of contact between said sprag and the outer race during overrunning of the outer race of the clutch such that the centrifugal force acting on the sprag during overrunning of the outer race of the clutch acts in conjunction with the spring force on the sprag so as to maintain a small load between the sprag and the inner race on overrun of the outer race, at least within a predetermined limit of outer race overrunning speed, in which the sprags and the energising springs are staggered whereby each pair of adjacent sprags of said ring of sprags are offset relative to one another axially of the assemblage, and likewise the pair of springs associated with them, the sprags being shaped and arranged to interengage with one another between the springs to limit the tilt of the sprags in the driving phase of the clutch.

2. A sprag-retainer assemblage as claimed in claim 1, in which the sprags are further shaped and arranged to engage with the sprag retainer to limit the tilt of the sprags in the opposite sense, such as might otherwise lead to pop-out or kick-off of the sprags.

3. A sprag-retainer assemblage as claimed in claim 2, in which the sprags are further shaped and arranged so that adjacent pairs of the sprags engage with one another further to limit the tilt of the sprags in said opposite sense, as aforesaid, such as might otherwise lead to pop-out or kick-off of the sprags.

4. A sprag-retainer assemblage as claimed in claim 1, in which the annular sprag retainer is formed in two annular parts assembled side-by-side.

5. A sprag-retainer assemblage as claimed in claim 4, in which the two annular parts of the sprag retainer are removably assembled side-by-side and held together by spring clips.

6. A sprag-retainer assemblage as claimed in claim 4, in which the two annular parts of the sprag retainer have interfitting formations which locate them angularly with respect to one another.

7. A sprag-retainer assemblage as claimed in claim 4, in which the two annular parts of the sprag retainer have interfitting formations which locate them concentrically with resepct to one another.

8. A sprag-retainer assemblage as claimed in claim 4, in which the two annular parts of the sprag retainer are formed as or comprise mouldings.

9. A sprag-retainer assemblage as claimed in claim 8, in which the mouldings are plastics mouldings.

10. A sprag-retainer assemblage as claimed in claim 1, in which the sprags and the retainer have interlocking formations which are urged into interlocking engagement with one another by the springs individual to the sprags so long as the assemblage is free of any races, the interlocking formations then resisting radially inward displacement of the sprags with respect to the retainer.

11. A sprag-retainer assemblage as claimed in claim 1, in which the centrifugal force acting on each sprag during overrunning of the outer race of the clutch passes through said line of contact of the sprag with the outer race of the clutch.

12. A sprag-retainer assemblage as claimed in claim 1, in which the centrifugal force acting on each sprag during overrunning of the outer race of the clutch passes to that side of said line of contact of the sprag with the outer race of the clutch such as to oppose the spring force tending to tilt the sprag about said line, as aforesaid.

13. A sprag-retainer assemblage as claimed in claim 1 in which the centrifugal force acting on each sprag during overrunning of the outer race of the clutch passes to that side of said line of contact of the sprag with the outer race of the clutch such as to assist the spring force tending to tilt the sprag about said line, as aforesaid.

14. A sprag-retainer assemblage as claimed in claim 1, in which each energising spring is a blade spring.

15. A sprag-retainer assemblage as claimed in claim 14, in which each blade spring comprises a lightweight, elongated arm anchored to the sprag retainer at one end, the other, free end of the arm engaging the sprag.

16. A sprag-retainer assemblage as claimed in claim 15, in which said spring arm is anchored at its radially inner end, the arm extending outwardly at an angle to the radial direction to its other, free end which engages the sprag.

17. A sprag-retainer assemblage as claimed in claim 14, in which the blade spring is of U-shape comprising a further elongated arm joined with said first elongated arm at its radially inner end, and said further elongated arm is attached to the sprag retainer.

18. A sprag-retainer assemblage as claimed in claim 17, in which said further elongated arm is removably attached to the retainer.

19. A sprag-retainer assemblage as claimed in claim 1, in which the annular sprag retainer receives and guides the radially outer ends of the sprags for tilting movement.

20. A sprag clutch comprising inner and outer races and at least one sprag-retainer assemblage disposed in an annular gap between the races and arranged to transmit a uni-directional drive between the clutch driving and driven race, the sprag-retainer assemblage comprising an annular sprag retainer, a ring of sprags in the retainer, and for each sprag an energising spring individual to the spring for biasing the sprag into substantially line contact with the inner race of the clutch, by tilting the sprag about substantially a line of contact with the outer race of the clutch, with a component of spring force directed radially inwardly of the assemblage, whereby the centrifugal force acting on the spring during overrunning of the outer race of the clutch, in use of the assemblage, relieves the spring force on the sprag, the centre of gravity of each sprag being disposed close to or in the radial axial plane of the assemblage containing said line of contact between said sprag and the outer race during overrunning of the outer race of the clutch such that the centrifugal force acting on the sprag during overrunning of the outer race of the clutch acts in conjunction with the spring force on the sprag so as to maintain a small load between the sprag and the inner race on over run of the outer race, at least within a predetermined limit of outer race overrunning speed, the sprags and the energising springs being staggered whereby each pair of adjacent sprags of said ring of sprags are offset relative to one another axially of the assemblage, and likewise the pair of springs associated with them, the sprags being shaped and arranged to interengage with one another between the springs to limit the tilt of the sprags in the driving phase of the clutch.

21. A sprag clutch as claimed in claim 20, in which the sprags are further shaped and arranged to engage with the sprag retainer to limit the tilt of the sprags in the opposite sense, such as might otherwise lead to pop-out or kick-off of the sprags.

\* \* \* \* \*